United States Patent [19]

Matsuda

[11] Patent Number: 4,580,650

[45] Date of Patent: Apr. 8, 1986

[54] INDUSTRIAL TRUCK

[75] Inventor: Minoru Matsuda, Tokyo, Japan

[73] Assignee: Nissan Motor Co., Ltd., Yokohama, Japan

[21] Appl. No.: 634,025

[22] Filed: Jul. 24, 1984

[30] Foreign Application Priority Data

Jul. 28, 1983 [JP] Japan .............................. 58-138074
Sep. 2, 1983 [JP] Japan .............................. 58-161754

[51] Int. Cl.⁴ .............................................. B62D 39/00

[52] U.S. Cl. .................................... 180/89.1; 180/326; 180/330; 280/30; 280/769; 414/629; 414/631; 414/641; 414/920

[58] Field of Search ...................... 180/89.1, 326, 330, 180/324, 89.13; 280/30, 760, 769; 414/629, 631, 641, 920

[56] References Cited

U.S. PATENT DOCUMENTS

| | | | |
|---|---|---|---|
| 2,644,540 | 7/1953 | Balzer | 180/330 |
| 3,693,744 | 9/1972 | Horn et al. | 180/330 |
| 4,394,107 | 7/1983 | Siebert | 414/631 |
| 4,450,925 | 5/1984 | Gardner | 180/89.1 |
| 4,504,077 | 3/1985 | Hobbs | 414/629 |

FOREIGN PATENT DOCUMENTS

| | | |
|---|---|---|
| 58-19872 | 2/1983 | Japan . |
| 58-23775 | 2/1983 | Japan . |
| 58-52026 | 4/1983 | Japan . |
| 58-103960 | 7/1983 | Japan . |

*Primary Examiner*—David M. Mitchell
*Assistant Examiner*—Kenneth R. Rice
*Attorney, Agent, or Firm*—Leydig, Voit & Mayer, Ltd.

[57] ABSTRACT

A main body of an industrial truck is formed with mounting bracket sections to which an instrument assembly and counterweight for a tractor and a mast assembly and counterweight for a forklift truck are selectively mountable, so that the industrial truck serves as the tractor and the forklift truck. Additionally, a top panel having an operator's seat is mounted on the main body in a manner to be turnable end for end in accordance with the intended purposes.

18 Claims, 10 Drawing Figures

INDUSTRIAL TRUCK

BACKGROUND OF THE INVENTION

This invention relates to an industrial truck which can be used for multiple purposes, for example, as a forklift truck, a tractor and the like.

In connection with industrial trucks, for example, a forklift truck and a tractor are individually produced and used for their single intended purpose, and therefore both the individual forklift truck and tractor are necessary in order to attain two intended purposes, requiring high expense for purchasing them.

In view of the above, the inventor's attention has been drawn to the fact that the forklift truck and the tractor are so considerably similar in construction that they are both made up of a main body of a frame structure equipped with driving road wheels and steering road wheels, the wheel base therebetween being generally equal for the forklift truck and the tractor. Furthermore, they are also similar in a point that an operator's seat is formed on a top panel covering an engine mounted on the main body.

Accordingly, it has been envisaged by the inventor that a sharp expense reduction will be achieved by commonly using, both as the forklift and the tractor, a single main body equipped with functional components such as road wheels and an engine, and the top panel, thereby facilitating handling of the industrial truck and improving usability of the same for both dealers and users.

SUMMARY OF THE INVENTION

An industrial truck according to the present invention comprises steering road wheels and driving road wheel which are respectively connected to first and second end portions of a truck main body. The truck main body is formed with first and second mounting bracket sections respectively formed at the first and second end portions of the truck main body. A plurality of industrial truck components for different purposes are selectively and detachably mountable to each mounting section. Additionally, a top panel having an operator's seat is detachably mounted on the track main body and turnable end for end to be fit for different purpose uses. Accordingly, the industrial truck can be used, for example, as a tractor or a forklift truck, by selectively mounting to the first mounting bracket section an instrument panel assembly for the tractor or a counterweight for the forklift truck and by selectively mounting to the second mounting bracket section a mast assembly for the forklift track or a counterweight for the tractor, while commonly using the truck main body, the road wheels, and the top panel.

BRIEF DESCRIPTION OF THE DRAWINGS

The feature and advantages of the industrial truck according to the present invention will be more clearly appreciated from the following description taken in conjunction with the accompanying drawings in which the same reference numerals designate the corresponding parts and elements, in which.

DETAILED DESCRIPTION OF THE INVENTION

Figure 1:
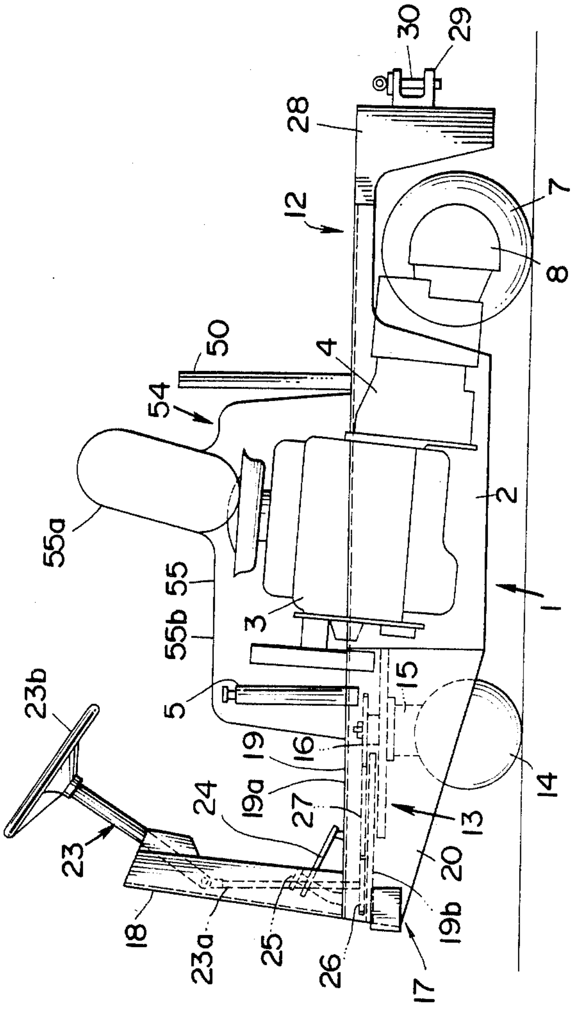
FIG. 1 is a side view of an embodiment of the industrial truck of the present invention in case of being used as a tractor, showing the inside construction of the truck.
Figure 2:
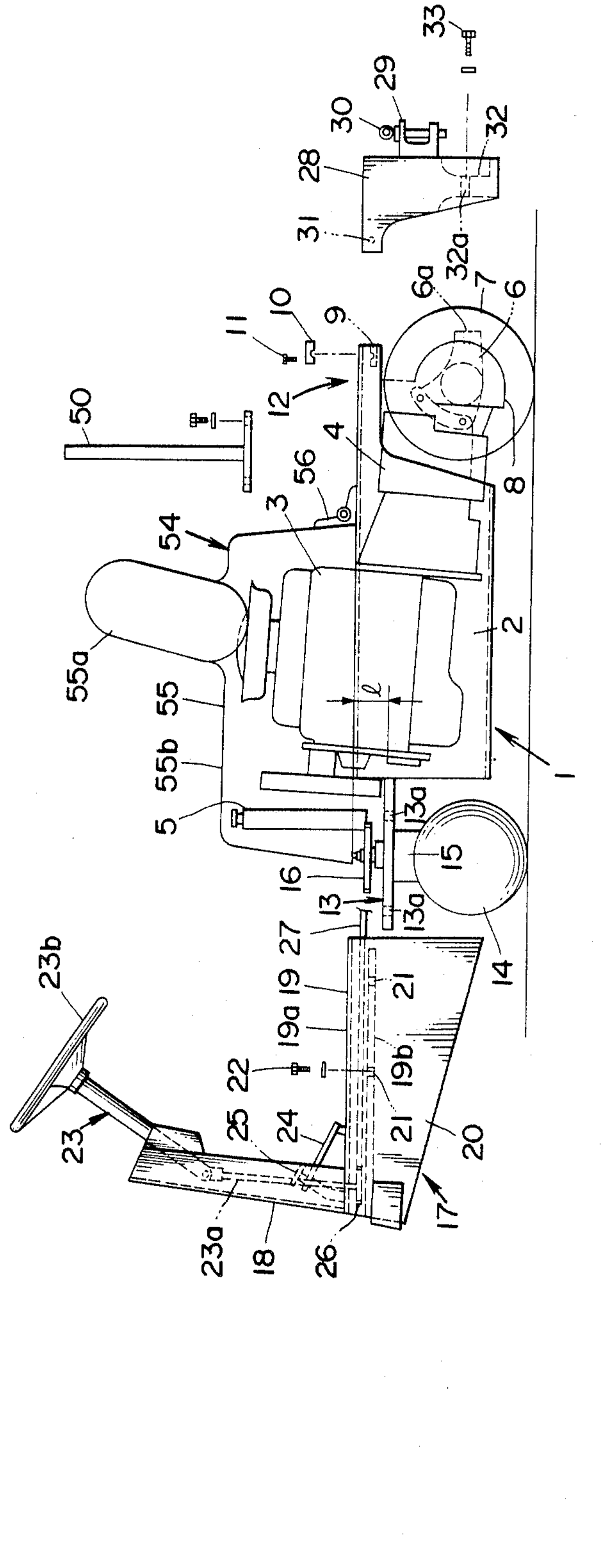
FIG. 2 is an exploded side view of the industrial truck of FIG. 1.
Figure 3:
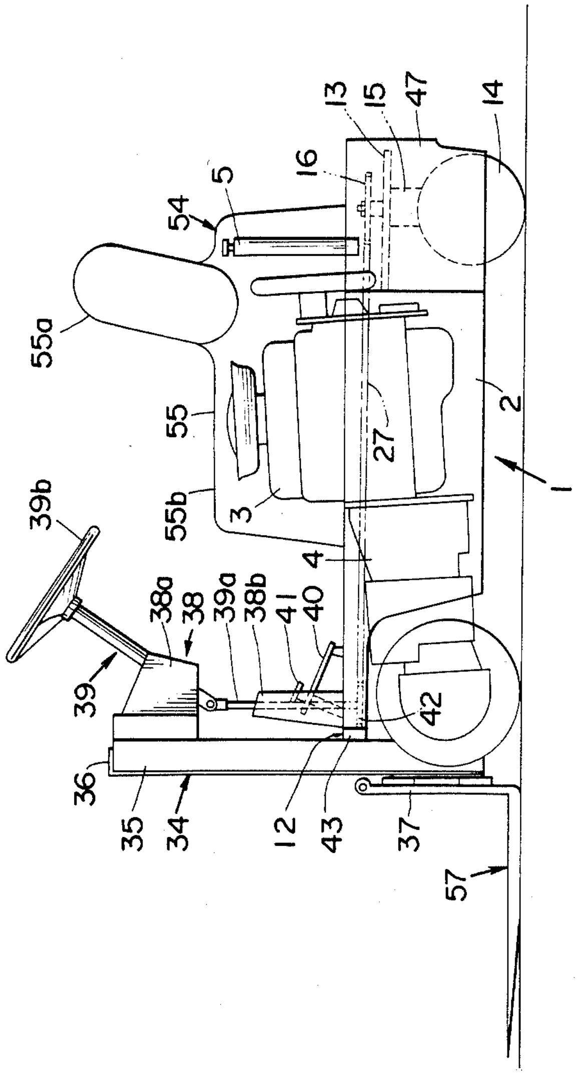
FIG. 3 is a side view of the embodiment of the industrial truck of the present invention of FIG. 1 in case of being used as a forklift truck, showing the inside construction of the truck.
Figure 4:
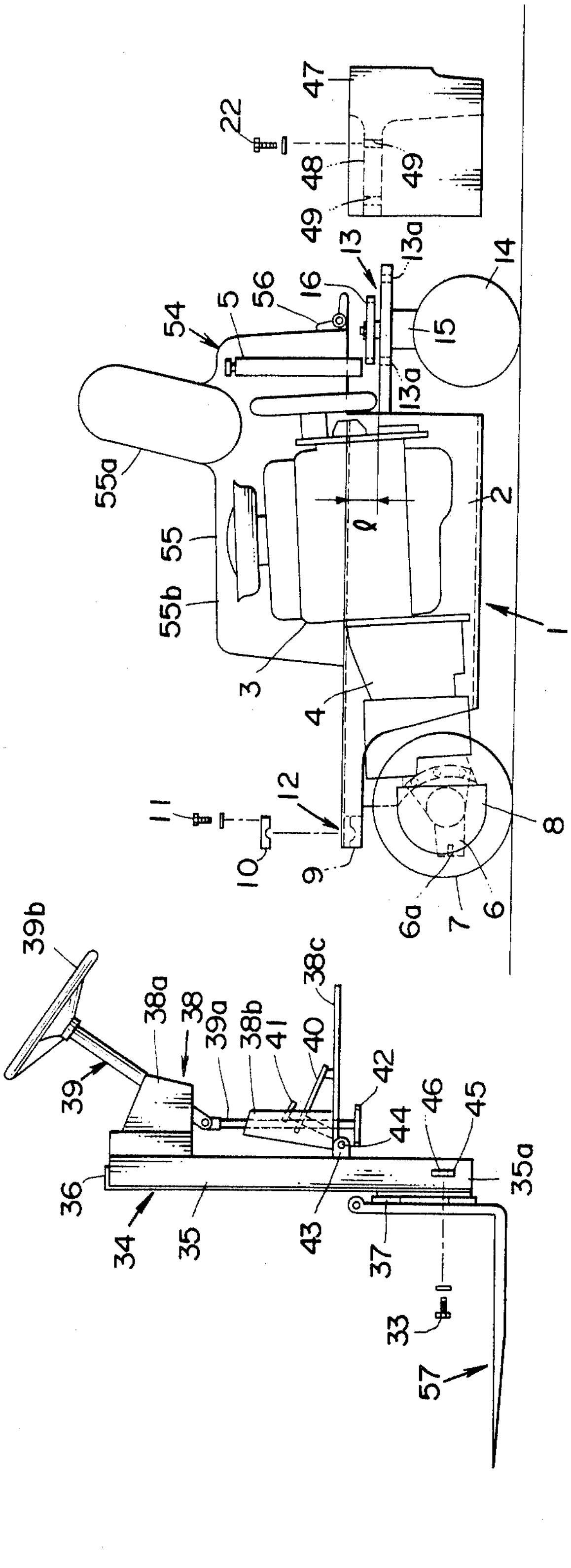
FIG. 4 is an exploded side view of the industrial truck of FIG. 3.
Figure 5:
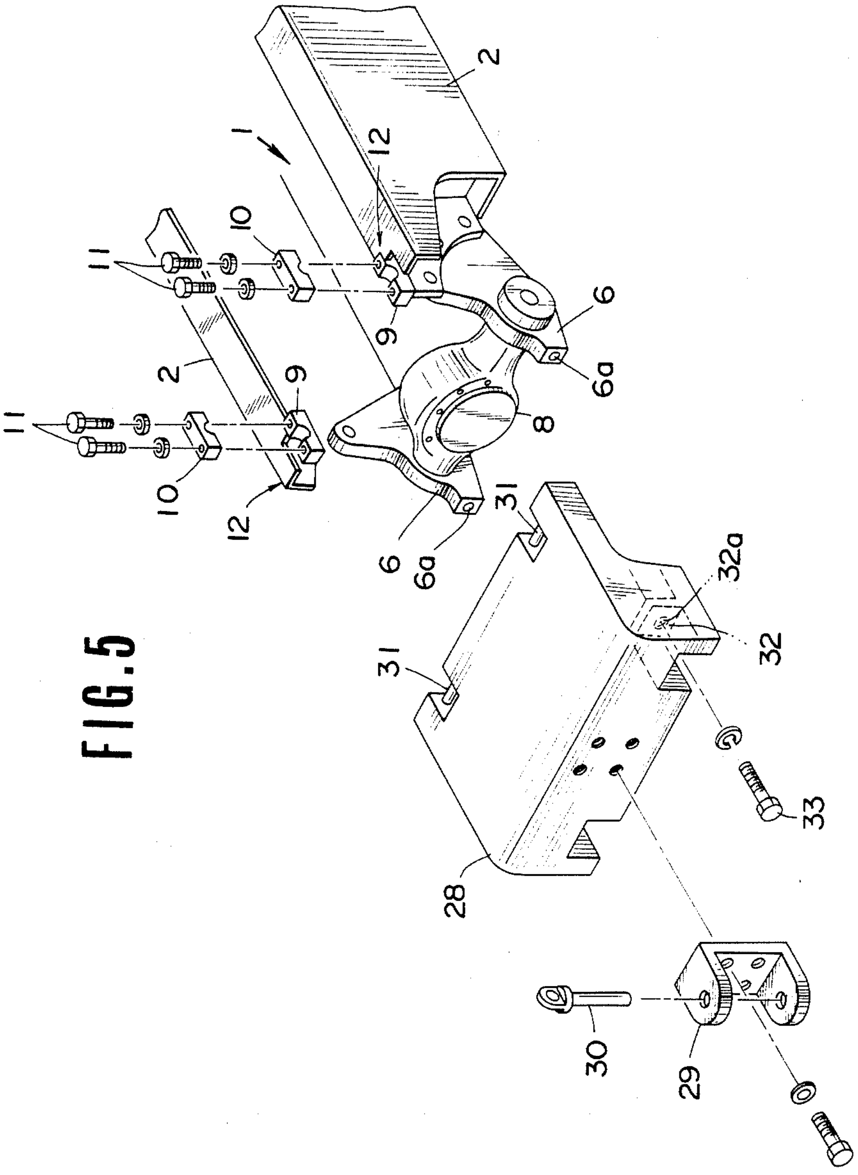
FIG. 5 is an enlarged exploded perspective view showing the connection of a mounting bracket section of a truck main body and a counterweight for the tractor.

Referring now to FIGS. 1 to 6 of the drawings, there is shown an embodiment of an industrial truck of the present invention, which is usable for two purposes, i.e., as a tractor (as shown in FIGS. 1 and 2) and a forklift truck (as shown in FIGS. 3 and 4). The industrial truck comprises a truck main body 1 of a frame structure which body includes right and left body frames 2, 2 which are parallelly spaced and extend parallel with the center axis (not shown) of the truck main body 1. An internal combustion engine 3 and a transmission 4 are mounted between the right and left body frames 2, 2. The engine 3 is fluidly connected to a radiator 5 to be cooled. As clearly shown in FIG. 5, securely attached to the lower sides of one ends of the body frames 2, 2 at are axle mounting brackets 6, 6 which support a drive axle 8 for driving road wheels 7, 7 which are included in the drive means for the truck main body. Each mounting bracket 6 is formed at its lower projecting part with a threaded hole 6*a*. Additionally, each body frame 2 is rigidly provided with a pin support 9 to which a mounting cap 10 is detachably connected by means of bolts 11, 11. The thus connected pin support 9 and mounting cap 10 define therebetween a generally cylindrical opening (no numeral) for rotatably supporting a pin. The ends of the body frames 2, 2 provided with the pin supports 9 and the mounting caps 10, and the axle mounting brackets 6, 6 constitute a mounting bracket section 12 to which a counterweight 28 for a tractor and a mast assembly 34 for a forklift truck will be selectively mounted or installed as discussed after.

Another mounting bracket section or plate member 13 is connected with the other ends of the body frames 2, 2 through a cross-member (not shown), and projected in the opposite direction of the mounting bracket section 12. This mounting bracket section 13 is so downwardly offset that the upper surface of the plate member 13 is spaced a distance l from the upper surface of each body frame 2, and located generally horizontal. Additionally, an axle shaft 15 for steering road wheels 14 also included in the drive means for the truck main body is rotatably supported through a bearing such as a thrust bearing and the like, and vertically extends so that its upper end is projected over the upper surface of the mounting bracket section 13. A sprocket wheel 16 is mounted on the axle shaft upper end and disposed parallel with the upper surface of the mounting bracket section 13. The axle shaft 15 is provided with a laterally extending shaft (no numeral) on which the steering road wheels 14, 14 are rotatably mounted and accordingly the steering road wheels 14, 14 turn around the axle shaft 15 when the sprocket wheel 16 is turned. The mounting bracket section 13 is formed with a plurality of installation holes 13*a*, to which mounting bracket section an instrument panel assembly 17 for the tractor and a counterweight 47 for the forklift truck are selectively mounted or installed as discussed after.

A top panel 54 is of a box shape and mounted on the truck main body 1 in a manner to cover the engine 3, the radiator 5 and like. The top panel 54 is formed at its upper section with an operator's seat 55 which includes a seat back section 55*a* and a seat cushion section 55*b*. The top panel 54 is connected through a hinge 56 to the truck main body 1 so that one end of the top cover is movable upward around the hinge 56 to cover or uncover the engine 3 and the like. Furthermore, the top panel 54 is detachable from the truck main body 1 and turnable end for end in the axial direction of the truck main body 1 so that the operator's seat can selectively face the side of the steering road wheels 14 and the side of the driving road wheels 7.

The instrument panel assembly 17 shown in FIGS. 1 and 2 is for the tractor and mountable to the mounting bracket section 13. The instrument panel assembly 17 includes an instrument frame 18 which is generally L-shaped in side view, and front side panels 20 attached to the opposite sides of the floor 19 of the instrument frame 18. The instrument frame floor 19 includes an upper floor plate 19*a* and a lower floor plate 19*b* which are spaced a suitable distance from each other. The lower floor plate 19*b* is formed with a plurality of installation holes 21 which are arranged to coincide with the installation holes 13*a* of the mounting bracket section 13 when the instrument panel assembly 17 is mounted to the mounting bracket section 13 in which bolts 22 (shown in FIG. 6) are inserted into the coinciding installation holes 21, 13*a* and secured in position by means of nuts (not shown). Accordingly, the the instrument panel assembly 17 is detachable from the mounting bracket section 13.

Figure 6:
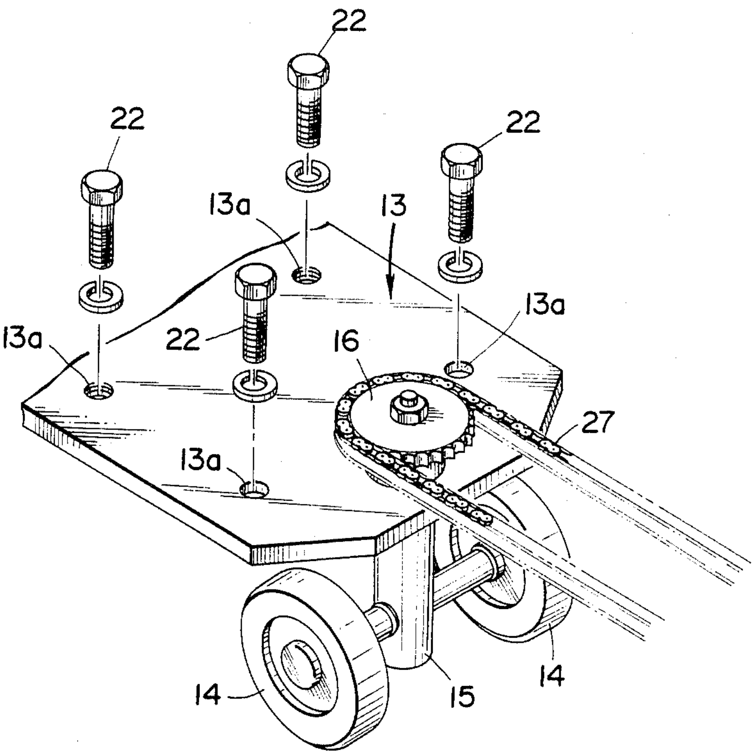
FIG. 6 is a perspective view showing another mounting bracket section of the truck main body.

The instrument frame 18 is provided with functional controls for the drive means of the truck main body including a steering wheel unit 23 and various functional controls such as an acceleration pedal 24, a brake pedal 25 and the like manipulable by an operator from the seat. The steering wheel unit 23 includes a steering linkage 23*a* whose lower end reaches between the upper and lower floor plates 19*a*, 19*b* and is securely provided with a sprocket wheel 26 which turns in accordance with the turning of a steering wheel 23*b*. It will be understood that the steering effort applied to the steering wheel 23*b* can be transmitted to the axle shaft 15 of the steering road wheels 14 to steer the industrial truck upon passing a chain 27 on the sprocket wheel 26 and the sprocket wheel 16 on the mounting bracket section 13 to connect them as shown in FIG. 6.

The counterweight 28 shown in FIGS. 1 and 2 is for the tractor and provided at its rear face with a bracket 29 to which a traction bar 30 is removably inserted. Engaging pins 31, 31 are secured to the front end opposite side portions of the counterweight 28 in a manner that each pin is cast-in or embedded at its opposite ends in the body of counterweight 28 as clearly shown in FIG. 5. Each pin 31 is arranged to be put in the semicylindrical groove of the pin support 9 and securely covered with the mounting cap 10 fastened to the pin support 9 by the bolts 11 when the counterweight 28 is mounted to the mounting bracket section 12. Additionally, the counterweight 28 is provided at its lower opposite sides with bracket sections 32 which have been formed by removing the beef near them. Each bracket section 32 is formed with an installation hole 32*a* and arranged to be fixed to the axle mounting bracket 6 by means of a bolt 33 which passes through the bracket section hole 32*a* and is secrewed into the axle mounting bracket threaded hole 6*a* when the counterweight 28 is mounted to the mounting bracket section 12.

The mast assembly 34 shown in FIGS. 3 and 4 is for the forklift truck and mountable to the mounting bracket section 12. The mast assembly 34 includes outer and inner masts 35, 36, a carriage 37 with fork tines 57, and an instrument frame 38 fixed to the outer mast 35. The instrument frame 38 is separated into an upper frame 38*a* and a lower frame 38*b*. The upper frame 38*a* is provided with a steering wheel unit 39. The lower frame 38*b* has a floor plate 38*c* which is equipped with an acceleration pedal 40, a brake pedal 41, and functional component parts (not shown) such as various operation levers and the like for a hydraulic actuator. The steering wheel unit 39 includes a steering linkage 39*a* whose lower end extends below the floor plate 38*c* and is securely provided with a sprocket wheel 42 which turns in accordance with the turning of a steering wheel 39*b*. It will be understood that the steering effort applied to the steering wheel 39*b* can be transmitted to the axle shaft 15 of the steering road wheels 14 to steer the industrial truck upon passing the chain 27 on the sprocket wheel 42 and the sprocket wheel 16 on the mounting bracket section 13 as shown in FIG. 6.

The outer mast 35 includes a pair of channel members 35*a*, 35*a* each of which is provided with a bracket 43 which rearwardly extends and has a connecting pin 44 which is arranged to be put in between the pin support 9 and the mounting cap 10 of the truck main body side when the mast assembly 34 is mounted to the mounting bracket section 12. Each channel member 35*a* of the outer mast 35 is further provided at its side surface with a bracket 45 having an installation hole 46 which bracket is arranged to be secured to the axle mounting bracket 6 by means of a bolt 33 which is inserted in the bracket installation hole 46 and secrewed into the threaded hole 6*a* of the axle mounting bracket 6 when the mast assembly 34 is mounted to the mounting bracket section 12 of the truck main body 1.

The counterweight 47 shown in FIGS. 3 and 4 is for the forklift truck and integrally formed at its upper opposite sides with brackets 48, 48 each having a plurality of installation holes 49 which are arranged to coincide with the installation holes 13*a* of the mounting bracket section 13. Accordingly, the counterweight 47 can be detachably mounted to the mounting bracket section 13 by inserting the bolts 22 into the coinciding installation holes 49 and 13*a* and then fixing them with the nuts.

With the thus arranged industrial truck, for example, when used as the tractor as shown in FIGS. 1 and 2, the instrument panel assembly 17 and the counterweight 28 both for the tractor are detachably mounted or installed to the mounting brackets sections 13 and 12, respectively, in the above-stated manner in which the steering road wheels 14 serve as front wheels. It is to be noted that the mounting bracket section 13 is so offset that its upper surface is spaced from the upper surface of the body frame 2 by the distance l thereby to form a space between them, and therefore it is facilitated to dispose linkages for the pedals 24, 25 and the like, and driving means such as the sprocket 16 and the chain 27 for the steering road wheels 14. The top panel 54 is put on the truck main body 1 in such a manner that the operator's seat 55 faces the side of the instrument panel assembly 17 or the steering road wheel side, and then the top panel is attached at its rear end section to the truck main body 1 by means of the hinge 56 so that the top panel 54 is rotatably movable around the hinge 56. In addition, a load deck guard 50 may be detachably installed to the truck main body 1 behind the operator's seat 55. It is to be noted that good driveability can be obtained in the case of being used as the tractor because the steering road wheels serve as the front wheels.

Next, when used as the forklift truck as shown in FIGS. 3 and 4 after the instrument panel assembly 17 and counterweight 28 for the tractor and the top panel 54 are removed from the truck main body 1, the mast assembly 34 and the counterweight 47 for the forklift truck ae detachably mounted or installed to the mounting bracket sections 12 and 13, respectively, in the above-stated manner in which the driving road wheels 7 serve as front wheels. The mast assembly 34 in this instance makes no tilting movement thereof and therefore each channel member 35*a* is fixed at its upper and lower positions, thereby obtaining stable support of the mast assembly 34. Furthermore, since the counterweight 47 for the forklift truck is installed such that its upper surface is at the same level as the upper surface of body frames 2, the external appearance of the industrial truck is not degraded. Moreover, the counterweight 47 of a heavy weight is supported all over the mounting bracket section 13 so that local concentration of load is prevented, thereby improving the durability of the industrial truck.

In this case, the top panel 54 is put on the truck main body 1 in such a manner that the operator's seat 55 faces the side of the mast assembly 34 or the driving road wheel side, and then the top panel 54 is attached at its rear end section to the truck main body 1 by means of the hinge 56 so that the top panel 54 is rotatably movable around the hinge 56, thus assembling the industrial truck as the forklift truck. It will be understood that the fork tines 57 may be replaced with various implements in order that the industrial truck serves as a ram lift, a side cramp or the like, thereby facilitating to achieve various operations suitable for cargo handling purposes.

Figure 7:
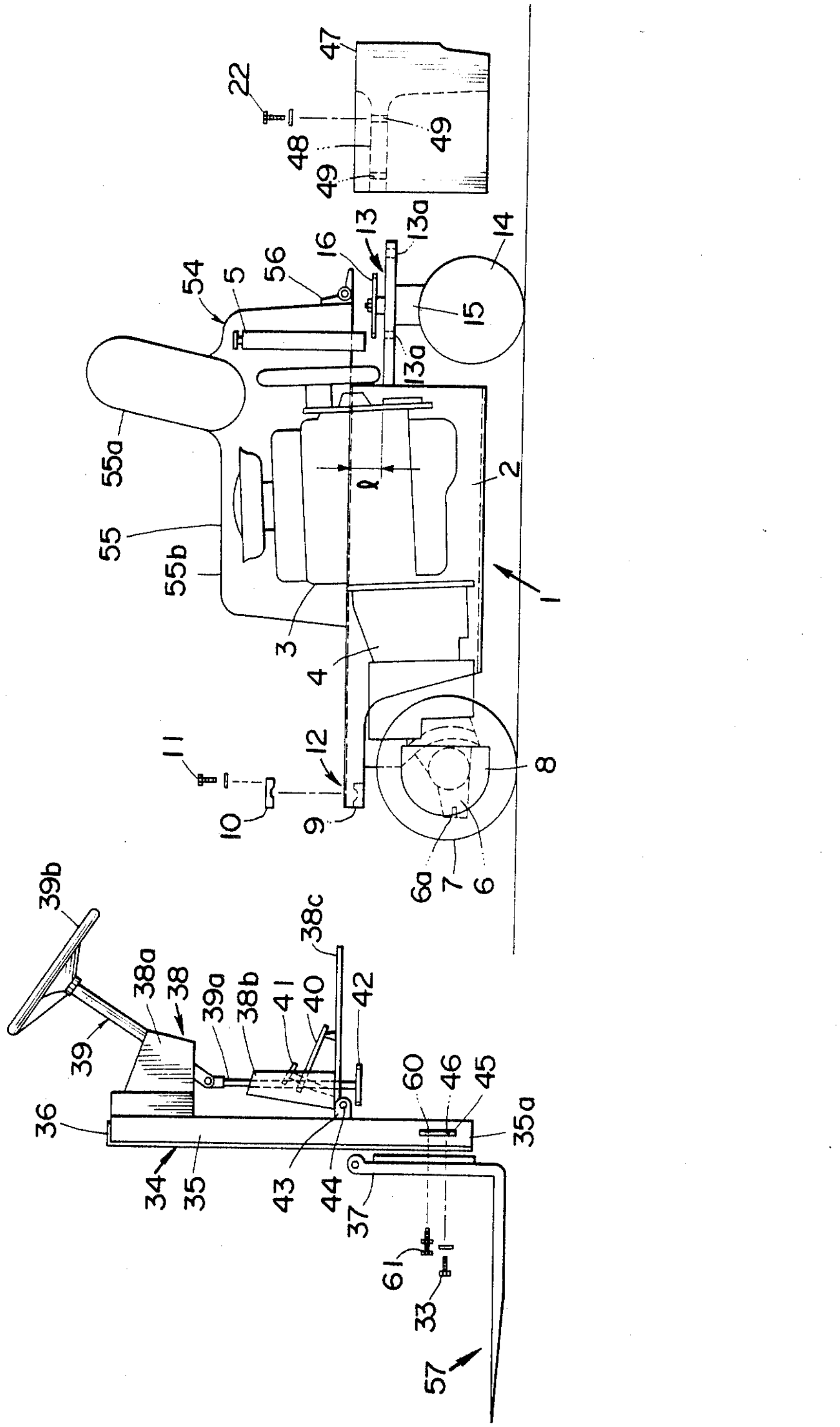
FIG. 7 is an exploded side view similar to FIG. 4, but showing a modified example of the industrial truck of the present invention.
Figure 8:
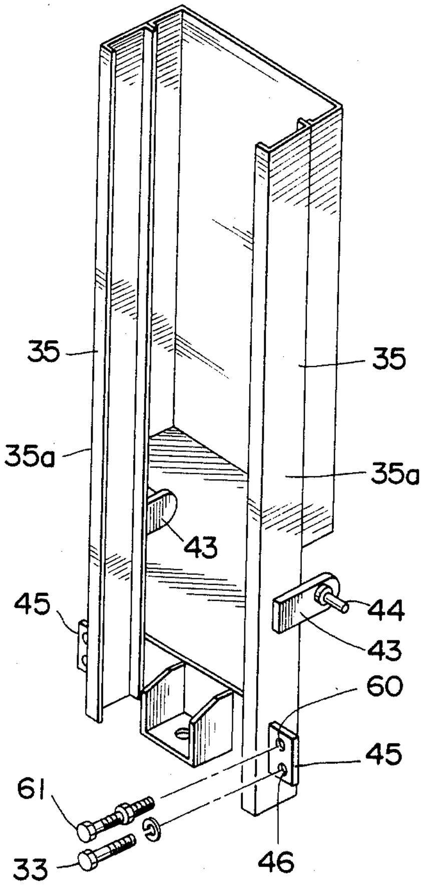
FIG. 8 is an enlarged perspective view of an essential part of a mast assembly for the forklift truck, of the industrial truck of FIG. 7.
Figure 10:
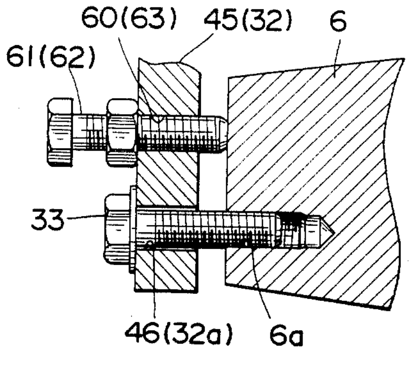
FIG. 10 is an enlarged segmentary view, partly in section, showing the construction of the angular position adjusting devices of FIGS. 8 and 9.

FIGS. 7, 8 and 10 illustrate an modified example of the industrial truck of the present invention, which is the same as in the embodiment of FIGS. 1 to 6 except for an angular position adjusting means provided to the mast assembly 34 for the forklift truck. As shown in FIGS. 7, 8 and 10, the bracket 45 is formed with a threaded hole 60 located above the hole 46. An adjustment bolt 61 forming part of the angular position adjusting means 61 is screwed in the threaded hole 60 to be contactable with the end face of the axle mounting bracket 6. It will be understood that the angular position of the mast assembly 34 is varied by adjusting the projecting amount of the adjustment bolt 61 beyond the bracket 45 in the direction toward the axle mounting bracket 6. Thus, the mast assembly 34 can be mounted in an angular position which is selected to be suitable for cargo handling operations. Particularly in case the fork tines 57 are attached to the carriage 37 to be used as the forklift truck, the mast assembly 34 is mounted in a slightly backwardly inclined state, thereby preventing cargo from tumbling down and accordingly securing safety loading and unloading operations of the forklift truck.

Figure 9:
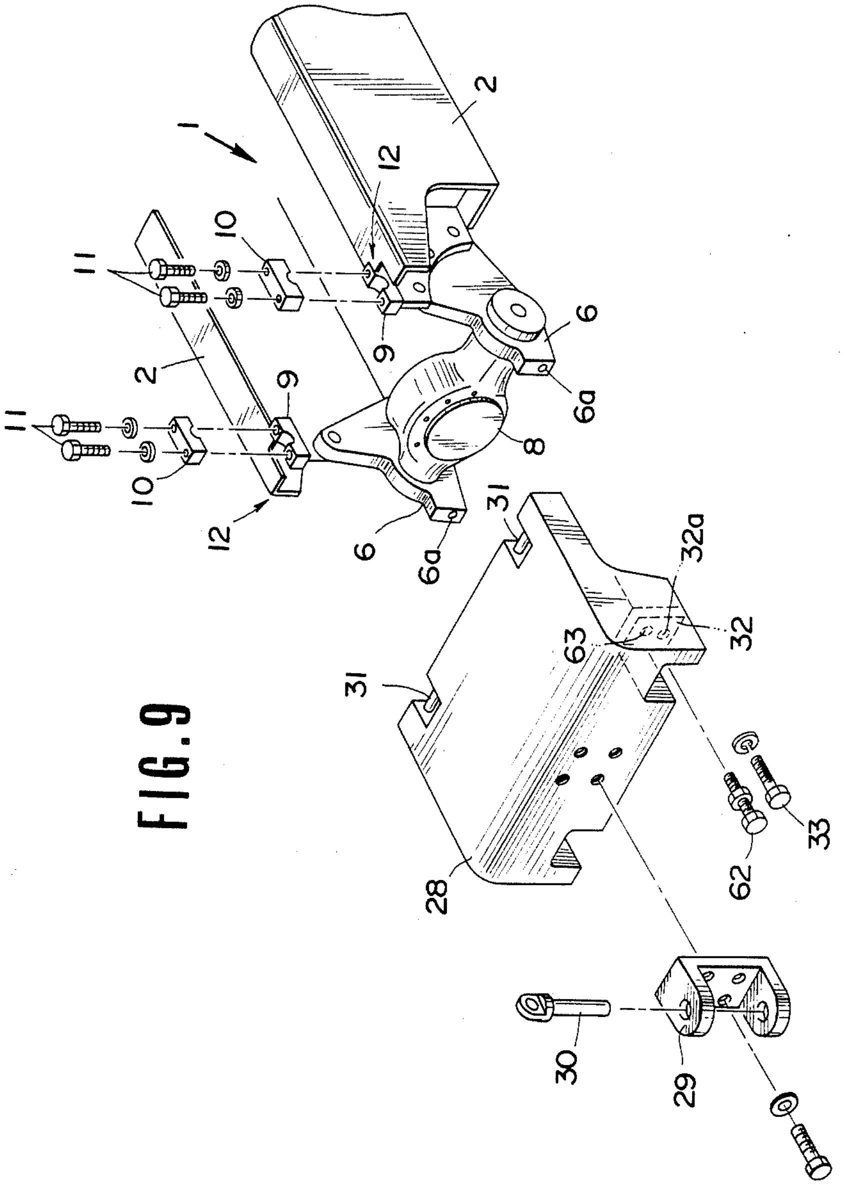
FIG. 9 is an enlarged exploded perspective view similar to FIG. 5, but showing a further modified example of the industrial truck of the present invention including an angular position adjusting device for the counterweight.

In addition, a similar angular position adjusting means may be provided to the counterweight 28 for the tractor as shown in FIGS. 9 and 10. In this instance, the angular position adjusting means is made up of an adjustment bolt 62 screwed in a threaded hole 63 which is formed in the bracket 32 and located above the hole 32*a*. The thus screwed adjustment bolt 62 is projected beyond the rear face of the bracket 32 and reaches the end face of each axle mounting bracket 6. The angular position adjustment of the counterweight 28 is carried out by selecting the projecting amount of the adjustment bolt 62 beyond the rear surface of the bracket 32. With this arrangement, if there is dimensional error of the location of the pin 31 and the bracket 32 in the axial direction of the industrial truck, it is facilitated to appropriately mount the counterweight in the horizontal state with no inclination.

As will be appreciated from the above, according to the present invention, the single industrial truck can be used for multiple purposes, for example, as the tractor and as the forklift truck by commonly using essential components such as the truck main body and the top panel while by selectively mounting to the truck body mounting bracket sections the instrument panel assembly and counterweight for the tractor and the mast assembly and counterweight for the forklift truck, in which the mounting direction of the top panel is changed in accordance with the intended purposes. Accordingly, expense for purchasing plural industrial trucks is sharply reduced while facilitating handling the industrial trucks for dealers and improving usability of the industrial truck for users.

What is claimed is:

1. An industrial truck comprising:

a truck main body;

drive means for said truck main body including steering road wheels and driving road wheels which are respectively connected to first and second end portions of said truck main body;

first and second mounting bracket sections respectively formed at the first and second end portions of said truck main body, a plurality of industrial truck components for different purposes selectively and detachably mountable to each mounting bracket section, certain of said components having control means including operator manipulable functional controls adapted to be coupled to control the drive means of said truck main body;

a seat for an operator; and means including a top panel detachably mounted on said truck main body and turnable end for end for different uses and to support said seat facing either said first or said second end portions of said truck main body to position an operator to manipulate said functional controls from said seat.

2. An industrial truck as claimed in claim 1 wherein said first and second end portions of said truck main body are located opposite to each other in axial direction of said truck main body.

3. An industrial truck as claimed in claim 2 wherein said top panel is generally of a box-shape and has first and second ends which are located opposite to each other in the axial direction of said truck main body, in which said top panel is constructed and arranged to be so turnable that the first and second ends thereof reverse in location in the axial direction of said truck main body.

4. An industrial truck as claimed in claim 1 further comprising a plurality of first industrial truck components for different purposes, selectively and detachably mountable to said first mounting section; and a plurality of second industrial components for different purposes, selectively and detachably mountable to said second mounting section.

5. An industrial truck comprising:

a truck main body;

steering road wheels and driving road wheels respectively connected to first and second end portions of said truck main body;

first and second mounting bracket sections respectively formed at the first and second end portions of said truck main body, a plurality of first industrial truck components for different purposes, selectively and detachably mountable to said first mounting section, said first components including an instrument panel assembly for a tractor, and a counterweight for a forklift truck; and a plurality of second industrial components for different purposes, selectively and detachably mountable to said second mounting section, said second components including a counterweight for the tractor, and a mast assembly for a forklift truck.

6. An industrial truck as claimed in claim 5 wherein said truck main body includes first and second straight elongate body frames which are parallel with each other and extend in axial direction of said truck main body.

7. An industrial truck as claimed in claim 6 wherein said first mounting bracket section includes a horizontally disposed bracket plate connected to said body frames, said steering road wheels being rotatably connected to said bracket plate.

8. An industrial truck as claimed in claim 7 wherein said second mounting bracket section includes a first bracket formed at one end of each body frame, and a second bracket formed at a part of an axle mounting bracket connected to each body frame, said axle mounting bracket supporting a drive axle for said driving road wheels.

9. An industrial truck as claimed in claim 7 wherein said instrument panel assembly for the tractor includes a floor plate member detachably connectable with said bracket plate of said first mounting bracket section; and said counterweight for the forklift truck includes a plate type bracket detachably connectable with said bracket plate of said first mounting bracket section.

10. An industrial truck as claimed in claim 8 wherein said counterweight for the tractor includes a pin and a bracket section which are securely connectable with said first and second brackets of said second mounting bracket section, respectively; and said mast assembly for the forklift truck includes a pin rigidly connected to each of two elongate structural members, and a bracket formed at each elongate structural member, said pin and said bracket being securely connectable with said first and second brackets of said second mounting bracket section, respectively.

11. An industrial truck as claimed in claim 7 wherein said bracket plate is located such that the upper surface is downwardly spaced a predetermined distance from the upper surface of each body frame.

12. An industrial truck as claimed in claim 7 further comprising steering means which includes a first sprocket wheel rotatably supported by said bracket plate and drivingly connected to said steering road wheels.

13. An industrial truck as claimed in claim 12 wherein said instrument panel assembly for the tractor includes a second sprocket wheel drivingly connected to a steering wheel, said first and second sprocket wheels being drivingly connectable with each other by a chain.

14. An industrial truck as claimed in claim 12 wherein said mast assembly for the forklift truck includes a second sprocket wheel drivingly connected to a steering wheel, said first and second sprocket wheels being drivingly connectable by a chain.

15. An industrial truck as claimed in claim 10 further comprising means for detachably connecting said bracket of said mast assembly with said second bracket of said second mounting bracket section, said connecting means including a first bolt disposed in a hole of said bracket and screwed in a threaded hole of said second bracket of said second mounting bracket section.

16. An industrial truck as claimed in claim 15 further comprising means for adjusting angular position of said mast assembly, said adjusting means including a second bolt screwed in a threaded hole of said bracket and contactable with surface of said second bracket, said threaded hole being located above said hole for said first bolt.

17. An industrial truck as claimed in claim 10 further comprising means for detachably connecting said bracket section of said counterweight with said second bracket of said second mounting bracket section, said connecting means including a bolt disposed in a hole of said bracket section and screwed in a threaded hole of said second bracket of said second mounting bracket section.

18. An industrial truck as claimed in claim 17 further comprising means for adjusting angular position of said counterweight for the tractor, said adjusting means including another bolt screwed in a threaded hole of said bracket section and contactable with surface of said second bracket, said threaded hole being located above said hole for said bolt.

* * * * *